UNITED STATES PATENT OFFICE.

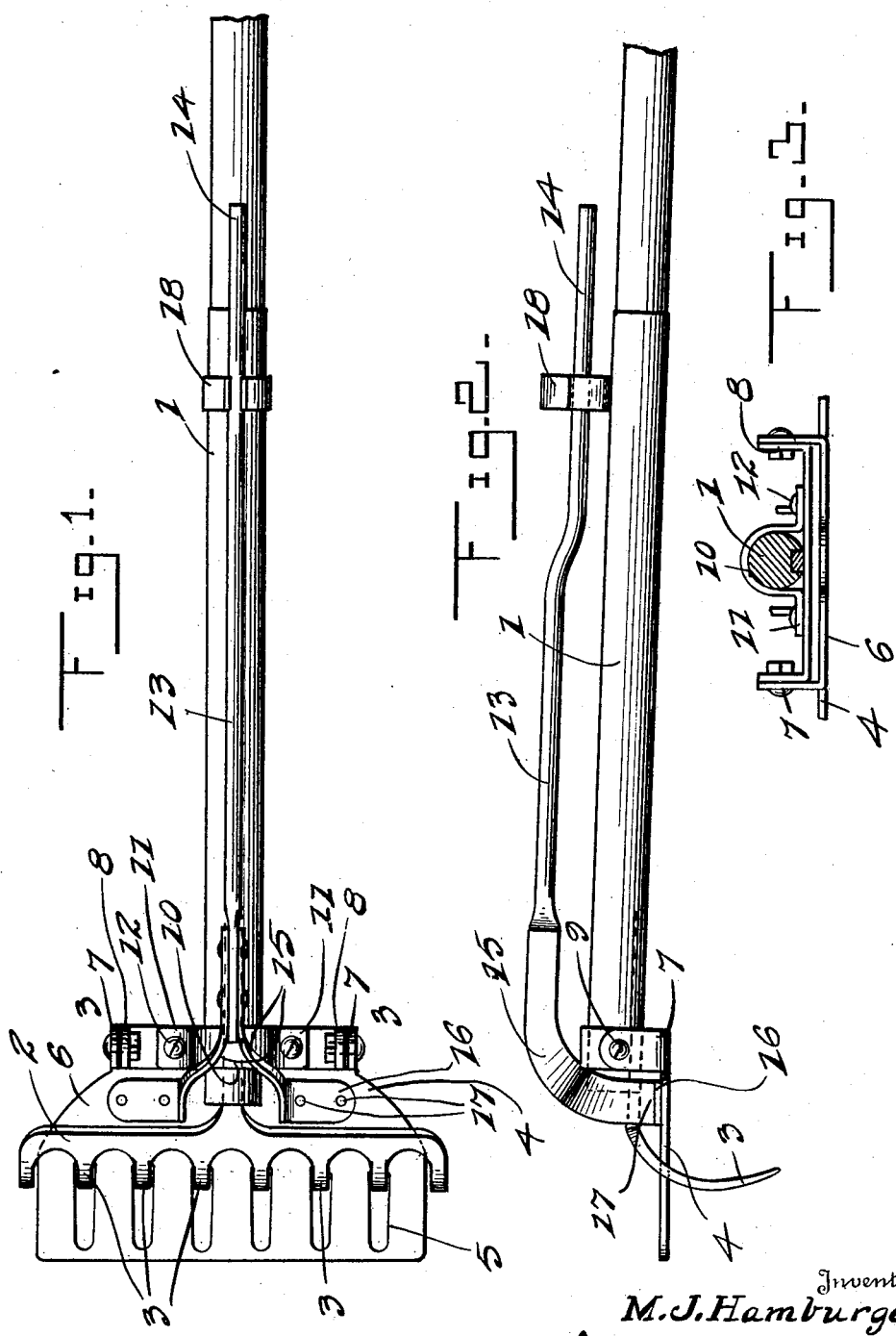

MARY J. HAMBURGER, OF BAYPORT, NEW YORK.

SELF-CLEANING RAKE.

1,234,755. Specification of Letters Patent. Patented July 31, 1917.

Application filed October 13, 1914. Serial No. 866,471.

*To all whom it may concern:*

Be it known that I, MARY J. HAMBURGER, a citizen of the United States, residing at Bayport, in the county of Suffolk and State of New York, have invented certain new and useful Improvements in Self-Cleaning Rakes; and I do hereby declare the following to be a full, clear, and exact description of the invention, such as will enable others skilled in the art to which it appertains to make and use the same.

My invention relates to a new and useful improvement in self-cleaning rakes and resides in the provision of an attachment for the ordinary style of rakes by means of which the teeth of the rake may be stripped of leaf trash and other foreign matter.

Another object is to provide novel stripping means that is of novel and effective construction and which will positively remove all of the leaf trash and other foreign matter from the teeth.

Another object of importance is to provide novel means for operating the stripping means that is readily accessible to the operator and which will be automatically held in closed position.

The above and additional objects are accomplished by such means as are illustrated in the accompanying drawings, described in the following specification and then more particularly pointed out in the claim.

With reference to the drawings, wherein I have illustrated the preferred embodiment of my invention as it is reduced to practice, and throughout the several views of which similar reference numerals designate corresponding parts, Figure 1 is a top plan view of my improved rake, Fig. 2 is a side elevation, and Fig. 3 is a transverse sectional view illustrating the construction for pivotally mounting the stripping plate on the handle of the rake.

Referring to the drawing by characters of reference the numeral 1 designates a rake handle of the ordinary construction, 2 the rake head and 3 face teeth of the ordinary construction and carried by said rake head. My improved stripping means consists of an approximately rectangular and flat metallic stripping plate 4 that is provided with a plurality of spaced parallel longitudinal slots 5 therein which receive the teeth 3. An extension 6 is formed on the rear edge of the plate 4 and formed integral with the extension on opposite sides thereof are upstanding apertured lugs or eyes 7. Secured upon the handle 1 is a U-shaped attaching bar 8 that has its side arm portions pivotally connected by suitable pivot pins 9 to the apertured lugs 7 and engaged with the inner faces of the apertured lugs as clearly shown in Fig. 3. A U-shaped clamping member 10 provided at its free ends with lateral apertured extensions 11 is mounted upon the handle 1 and has the extensions 11 disposed in engagement with the body portion of the U-shaped attaching bar 8. Bolts or other suitable fastening elements 12 are inserted through the apertured extensions 11 and the body portion of the U-shaped attaching bar 8 serves to secure the bar 8 and clamp 10 in opposite positions relative to the handle 1 together.

As a means for normally holding the stripping plate 4 in normal horizontal position as illustrated in Fig. 2 and for operating the plate 4 so that it is moved downwardly relative to the teeth 3 and strips the teeth I provide a relatively long operating lever or arm 13 that is provided at its free end with an offset handle portion 14 and at its other end is suitably secured to the upper end of attaching arms 15. The lower ends of the attaching arms are diverged and bent at right angles to the body portions thereof to provide laterally extending lugs or feet 16. Suitable fastening elements 17 are inserted through the extension 16 and into the plate 4 and preferably into the extended portion 6 of said plate. When the plate is in normal position the operating lever or rod 13 is disposed approximately parallel to the handle 1.

As the means for holding the lever 13 in inoperative or out of the way position I provide a V-shaped spring clip 18 that is secured upon the handle 1 and receives the handle portion 14 and the lever 13.

In operation when it is desired to strip the teeth, the handle portion 14 of the lever 13 is grasped and the lever moves outwardly away from the rake handle 1. Upon the outward movement of the lever 13 relative to the rake handle 1 plate 4 is caused to move downwardly relative to the free ends of the teeth 3 and will as will be clearly seen in Fig. 2 of the drawing remove all foreign matter from the teeth. By forcing the handle portion 14 of the lever 13 to the spring clip 18, the lever 13 and plate 4 will be held in out of the way or inoperative position. The plate 4 swings upon the pivot pin 9 as will be clearly seen and may be readily attached with its corresponding parts to any well known types of rakes without necessitating any material change in the construction of the rake.

In practice, I have found that the form of my invention, illustrated in the drawing and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

The combination with a rake, of a transverse bar located beneath and extending laterally from the rake handle and provided with upwardly extending terminals, a central clamp straddling the said handle and securing the transverse bar to the same, a stripping plate having a rear extension located beneath the handle and provided with opposite lugs pivoted to the terminals of the said bar, an operating lever extending longitudinally above the handle and provided with a forked front portion straddling the front end of the handle and rigidly secured to the rear extension of the stripping plate and means carried by the handle for engaging the operating lever.

In testimony whereof I affix my signature in presence of two witnesses.

MARY J. HAMBURGER.

Witnesses:
NANNETTE HAMBURGER,
MATILDA HAER.

Copies of this patent may be obtained for five cents each, by addressing the "Commissioner of Patents, Washington, D. C."